March 30, 1954  L. J. WOLF  2,673,450
ROTARY, TURBINE-TYPE HYDRAULIC COUPLING
Filed Jan. 24, 1950  4 Sheets-Sheet 1

Inventor:
Lloyd J. Wolf.
By John M Darley
Attorney.

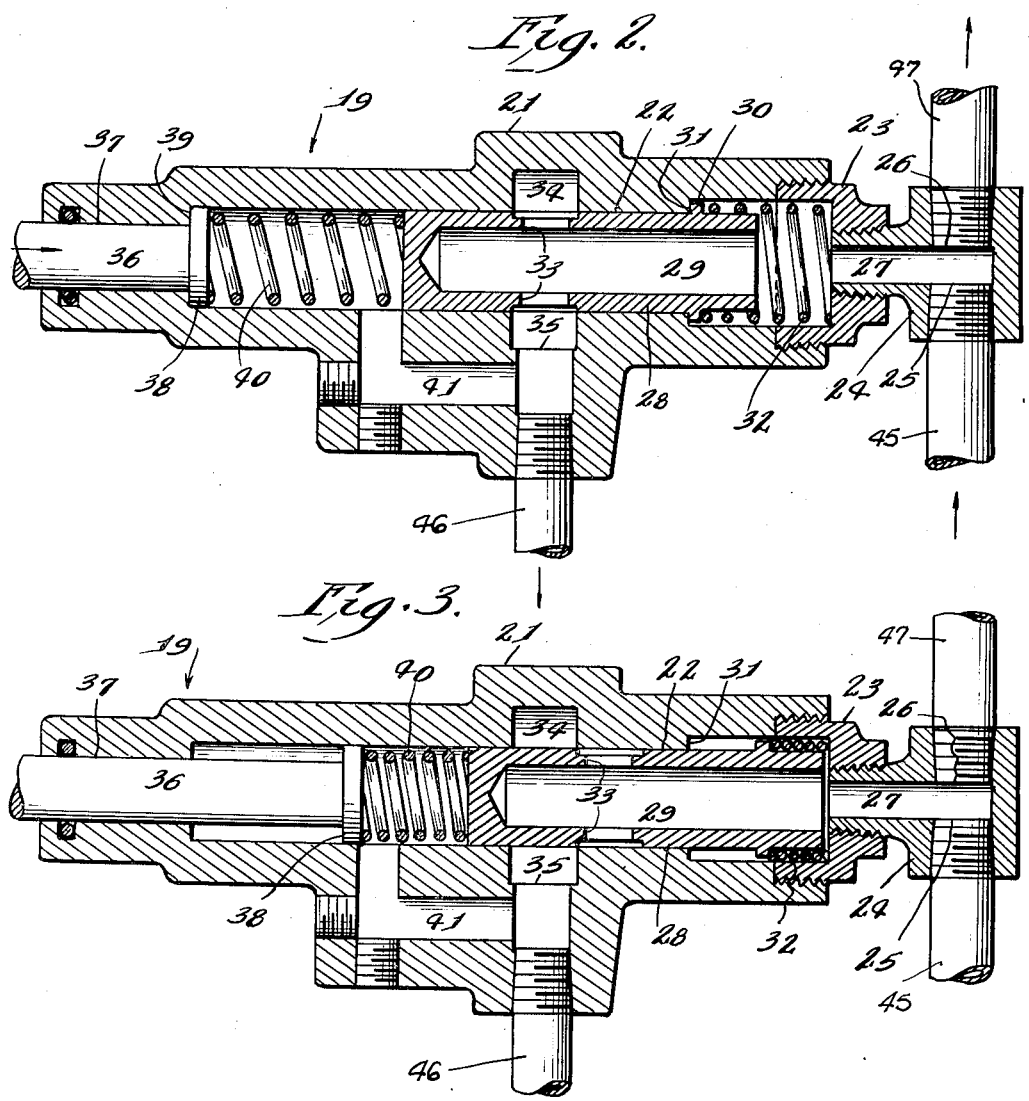

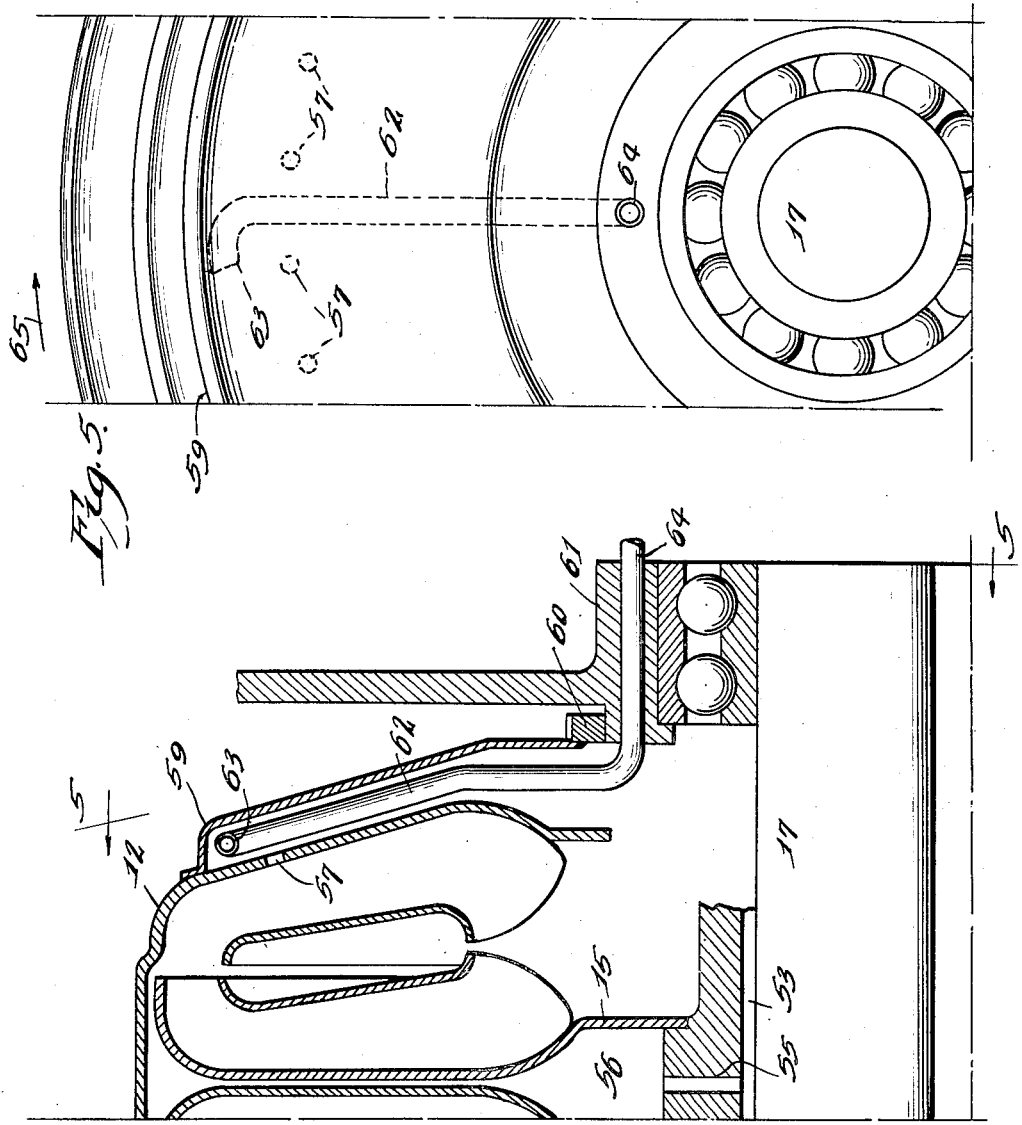

March 30, 1954　　　　L. J. WOLF　　　　2,673,450
ROTARY, TURBINE-TYPE HYDRAULIC COUPLING
Filed Jan. 24, 1950　　　　　　　　　　　　4 Sheets-Sheet 4
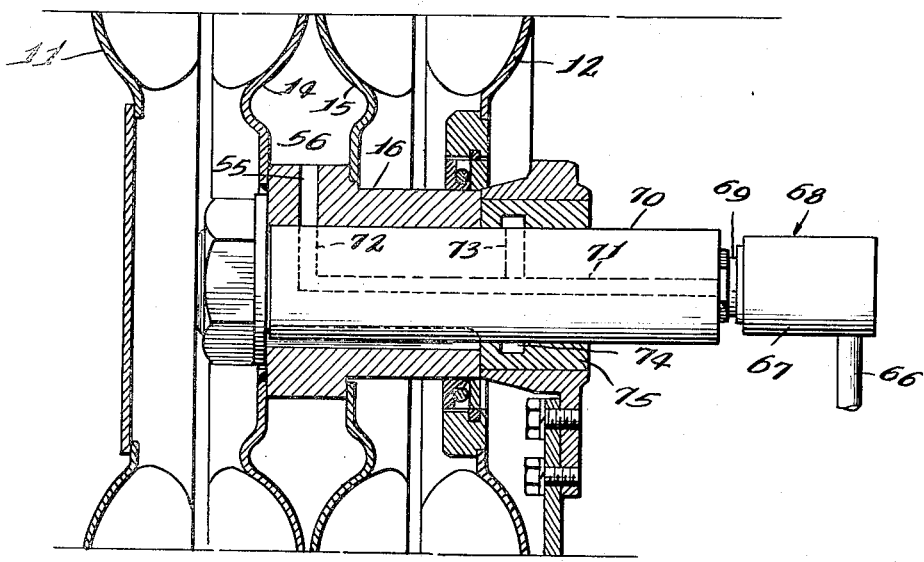
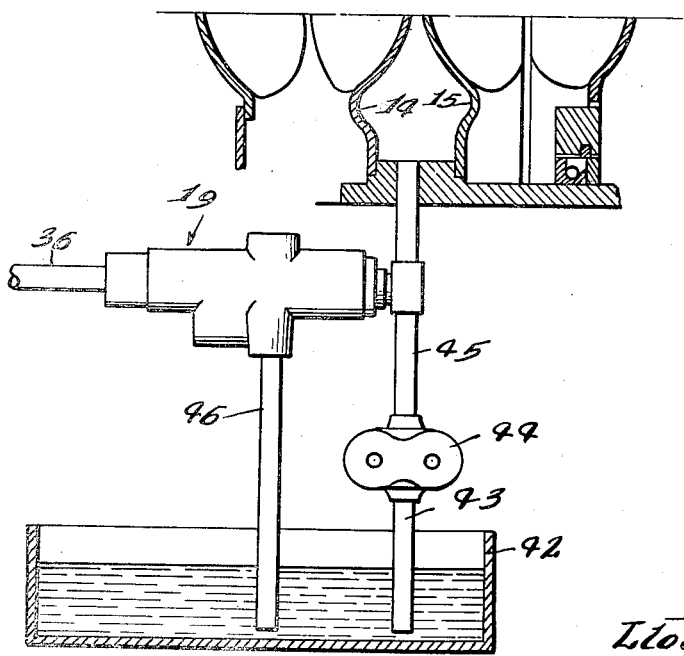
Inventor,
Lloyd J. Wolf.
By John W. Darley
Attorney.

Patented Mar. 30, 1954

2,673,450

UNITED STATES PATENT OFFICE 2,673,450

ROTARY TURBINE-TYPE HYDRAULIC COUPLING

Lloyd J. Wolf, Racine, Wis., assignor to Twin Disc Clutch Company, Racine, Wis., a corporation of Wisconsin Application January 24, 1950, Serial No. 140,320

2 Claims. (Cl. 60—54)

My invention relates to hydraulic couplings and more particularly to a device of this type in which provision is made for varying the power transmitting relation of the impeller and runner members and hence their relative slip by regulating the quantity of working liquid.

Couplings of this general type are broadly old and they possess the advantage of enabling the driven machine to be stopped without disturbing the driving machine or source of power and of placing in operation a driven machine requiring a high starting torque. Such a unit therefore has clutching characteristics while exhibiting the usual advantages of a hydraulic coupling during periods of power transmission. Efficient operation of such devices under the above conditions requires a rapid filling and emptying of the coupling. The foregoing considerations represent limiting conditions, but it is also desirable to meet intermediate requirements which envisage varying degrees of slip through the coupling to produce varying output speeds by a relatively constant speed source of power.

It is therefore one object of my invention to devise a coupling of the character indicated in which the working liquid is constantly supplied thereto during periods of power transmission by means operable to produce selected quantities of liquid in the coupling.

A further object is to provide a coupling having the foregoing characteristics which is equipped with constant size discharge orifices whose position controls the maximum amount of fill and whose area, in relation to the quantity of working liquid supplied to the coupling, regulates the rate of fill.

A further object is to devise a coupling as above in which provision is made for collecting the oil discharged by the coupling to prevent splashing of the interior of the associated housing.

A further object is to provide a coupling whose liquid passages form part of a hydraulic system which also includes means for lubricating the journaled portions of the coupling.

These and further objects of the invention will be set forth in the following specification, reference being had to the accompanying drawings and the novel means by which said objects are effectuated will be definitely pointed out in the claims.

In the drawings:

Fig. 2 is a sectional view of the control valve in a position such that oil is supplied for lubrication only.

Fig. 3 is a sectional elevation showing the valve in a displaced position for supplying oil for lubrication and to the coupling.

Fig. 4 is a fragmentary, sectional view of the coupling modified to include devices for collecting the oil discharged by the coupling.

Fig. 5 is a view looking in the direction of the arrows 5 in Fig. 4.

Fig. 6 is a further modification in section showing a method of supplying oil to the coupling through the shaft thereof.

Fig. 7 is a schematic view showing a hydraulic system including the coupling and control valve illustrated in Fig. 1.

Figure 1:
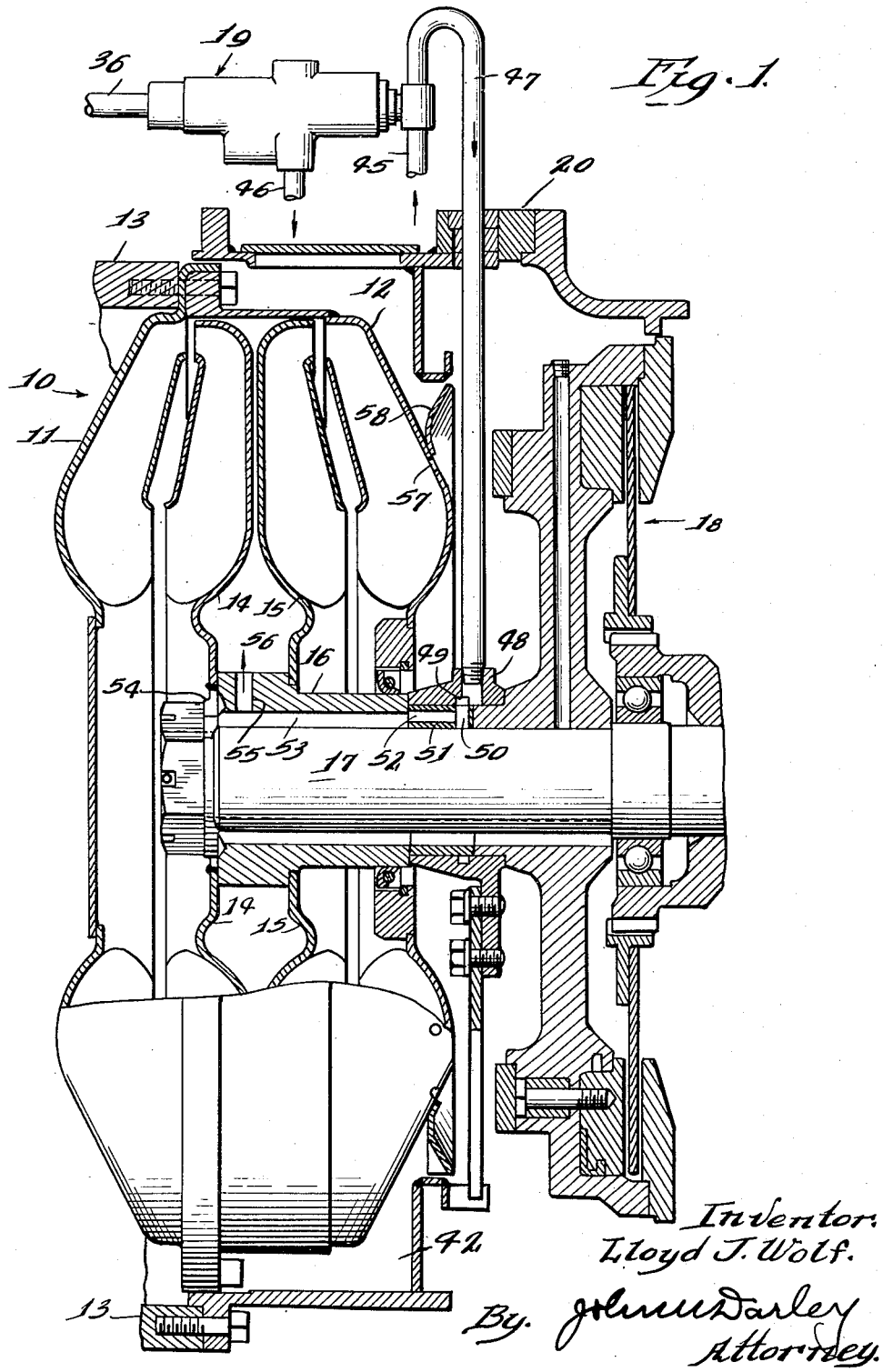
Fig. 1 is an elevation partly in section of the coupling including the valve which regulates the supply of the working liquid, usually an oil.

Referring to Fig. 1, the numeral 10 designates a twin circuit hydraulic coupling comprising a pair of connected, axially spaced and facing impellers 11 and 12 which have driven connection with a flywheel 13 that is intended to generally represent any source of power. Between the impellers is located a pair of oppositely facing runners 14 and 15 which respectively cooperate with the impellers 11 and 12 to develop power transmission through the coupling. The runners are fast on a hub 16 that is keyed to a driven shaft 17 which may in turn, if desired, be connected to an hydraulically actuated clutch generally indicated by the numeral 18, although the clutch forms no part of the present invention.

During periods of power transmission, the working liquid, usually an oil, is continuously supplied to and discharged from the coupling by means which regulate the pressure and flow rate of the oil. This control is effected by a valve 19, that is appropriately mounted on a casing 20 that encloses the coupling and is more particularly illustrated in Figs. 2 and 3 to which reference will now be made.

The valve 19 comprises an elongated casing 21 having a bore 22 extending therethrough. The right end of the casing carries a cap 23 and threaded in the cap is a T-fitting 24 having in one wing thereof an inlet port 25 and in the other wing a delivery port 26, both ports at all times communicating with each other and with a passage 27 in the central part of the fitting which constitutes a continuation of the bore 22.

A piston valve 28, slidable in the bore 22, includes a cavity 29 which opens towards the passage 27 and an exterior, annular rib 30 which, in the retracted or very low pressure establishing position of the valve as shown in Fig. 2, abuts an annular shoulder 31 formed by enlarging the diameter of the bore 22, the valve being urged towards this position by a helical spring 32 interposed between the rib 30 and the cap 23. The wall of the valve 28 is provided with a plurality of ports 33 which, in the retracted position of the valve, register with an annular chamber 34 which in turn communicates with an exhaust port 35, the chamber 34 and port 35 being located in the casing 21.

For the purpose of shifting the valve 28 to establish pressure in the delivery port 26, an actuating rod 36 is slidable in a reduced portion 37 of the bore 22 and extends outwardly from the left end of the casing for connection with a suitable operating means, such as a manually controlled handle (not shown). The inner end of the rod 36 carries a head 38 that engages a limiting stop 39 when the rod is retracted. A helical spring 40 is mounted in the bore 22 between the head 38 and the adjacent end of the valve 28 for a purpose presently explained. A drain passage 41 connects that part of the bore 22 which surrounds the spring 40 with the exhaust port 35 for the purpose of evacuating any of the controlled fluid that may leak past the valve 28.

The piping connection of the valve 19 in the hydraulic system including the coupling is schematically illustrated in Fig. 7 wherein the oil is withdrawn from a sump 42, that is provided in the lower part of the casing 20, through a pipe 43 by a suitably driven gear pump 44 which delivers the oil through a pipe 45 to the valve inlet port 25. The valve exhaust port 35 connects by a pipe 46 with the sump 42.

Oil which flows to the delivery port 26, as presently described, is supplied to one end of a pipe 47 whose opposite end extends within the casing 20 (see Fig. 1) and is attached to a collector ring 48 that encircles the shaft 17 in spaced relation thereto. The latter end of the pipe 48 constantly communicates with an annular channel 49 provided in the ring 48 which in turn communicates with a radial passage 50 in a spacer ring 51 that is keyed to the shaft 17 and rotarily fits therebetween and the fixed collector ring 48. A passage 52 extends between the ends of the spacer ring 51 to connect the radial passage 50 with one end of a passage 53 provided on the interior of the hub 16 and which may be formed by slotting the hub bore, with the surface of the shaft constituting one boundary of the passage 53. The opposite end of the passage 53 may be closed by a plate 54 carried by the adjacent end of the shaft 17.

An intermediate part of the passage 53 communicates by way of a radial passage 55 in the hub 16 with an annular chamber 56 included between those radially inward portions of the runners 14 and 15 which are connected to the hub. The oil supplied to the coupling is constantly discharged through a plurality of ports 57 provided in the outer shell of the impeller 12 and circumferentially spaced therearound, only one of the ports being illustrated. This discharge is preferably directed away from the impeller 12 by an annular dished baffle 58 carried by the impeller.

When the valve 28 is in the position shown in Fig. 2, full communication is established between the inlet port 25 and the exhaust port 35. Preferably, the relieving action of the latter port under the condition noted is such that sufficient oil flows through the pipe 47 for lubrication between the rings 48 and 51, but the coupling 10 is empty or substantially so. To establish maximum power transmission through the coupling, the valve 28 is shifted towards the right by the rod 36 to mask the exhaust port 35, as shown in Fig. 3, so that the coupling begins to fill and, assuming that the valve 28 is held in the latter position long enough, the coupling fills up to the maximum permitted by the discharging capacity of the ports 57, the latter being open at all times.

The radial distance of the ports 57 from the axis of the coupling controls the amount of fill, while the diameter of each port and their number controls, in relation to the quantity of oil supplied through the valve 19, the rate of fill. All of these factors may be varied as desired to meet the requirements of specific operating conditions. By properly relating these factors, it is possible to establish a pressure fill in the coupling and since this pressure is effective within the valve 28 (see Fig. 3), a relief of any excessive pressure is accomplished by a movement of this valve against the spring 40 which, in this situation, acts as a pressure regulating element. The spring 40 additionally provides for short movements of the valve 28 by relatively larger movements of the rod 36 and hence lessens the sensitivity of pressure changes for any movement of the rod.

To empty the coupling, the actuating rod 36 is withdrawn towards the left to the position shown in Fig. 2 whereupon the spring 32 shifts the valve 28 in the same direction until the ports 33 and 35 again register. The continued rotation of the impellers 11 and 12 then empties the coupling through the ports 57.

It will be obvious that any degree of variable slip in the coupling for the purpose of securing any desired relation between input and output speeds may be established by moving the valve 28 to a position that will provide the amount of fill required, the excess oil flowing through the partially unmasked exhaust port 35 to the sump. Since the valve 28 is immediately under the control of the operator, the coupling can be quickly conditioned to meet varying conditions so that the unit is characterized by the utmost flexibility.

In installations where it is desirable to prevent the oil discharged by the coupling from splashing the interior of the flywheel housing, the arrangement in Figs. 4 and 5 which is a modification of that shown in Fig. 1, may be employed. Like parts in these figures are designated by like numerals.

An annular shield 59 is spaced rearwardly from the impeller 12, the outer periphery of the shield having a leakproof connection with the shell of the impeller radially outward of the ports 57 while the inner peripheral edge may be attached to a seal 60 carried on the shouldered portion of an annular 61 in which the shaft 17 may be journaled. Accordingly, the shield 59 rotates with the impellers. A pipe 62 extends generally radially within the shield 59 in spaced relation thereto and the impeller 12, the outer end of the pipe 62 beyond the ports 57 being bent laterally to provide a scoop 63 which faces in a direction opposite to that in which the impeller 12 rotates. The opposite end 64 of the pipe 62 extends through and is carried by the annulus 61 and may be terminated in any convenient location. Any desired number of the pipes 62 may be used.

Assuming that the impeller 12 is rotating in the direction of the arrow 65, it will be apparent that the oil discharged through the ports 57 will tend to collect in the outer portion of the annular space between the impeller and shield 59 where it is picked up by the fixed scoops 63 for return to the sump. This arrangement positively prevents splashing by the discharged oil.

Instead of supplying oil to the coupling in the manner shown in Fig. 1, it may be admitted through a longitudinal passage in the output shaft of the impeller, the remaining parts so far as the coupling is concerned being identical with the Fig. 1 arrangement and are designated by like numerals.

The oil issuing from the delivery port 26 of the valve 19 flows through a pipe 66 corresponding to the pipe 47, to the stationary member 67 of a typical rotary seal generally indicated by the numeral 68. The hollow rotary member 69 of the seal 68 is carried by the end of the shaft 70, corresponding to the shaft 17, and constantly communicates with one end of a passage 71 which extends lengthwise of the shaft, the opposite end connecting with the inner end of a radial passage 72, also in the shaft, whose outer end registers with the inner end of the passage 55. For lubrication purposes, the passage 71 may also communicate with a radial passage 73 which in turn connects with an annular channel 74 in a sleeve 74 that has journal relation to the shaft 70. Rotary seals are well known in the art and do not require further illustration.

I claim:

1. In a rotary hydraulic drive, the combination of a hydraulic coupling comprising an impeller and a runner cooperably related to form a liquid working circuit, a pump for supplying liquid to the circuit, means for discharging the liquid from the circuit including a plurality of constant size ports in the impeller, valve means for controlling the amount of liquid supplied to the circuit including an elongated casing having a bore extending lengthwise thereof and including an inlet port, a delivery port and an exhaust port, all of the ports communicating with the bore and the inlet and delivery ports respectively connecting with the pump and circuit, and a piston valve member shiftable in the bore between limiting positions unmasking and masking the exhaust port to thereby vary the fill of the coupling, a manually operable, actuating rod slidable in the bore, and spring means interposed between the rod and valve member, and a sump communicating with the pump intake and the exhaust port.

2. In a rotary hydraulic drive, the combination of a hydraulic coupling comprising an impeller and a runner cooperably related to form a liquid working circuit, a pump for supplying liquid to the circuit, means for discharging the liquid from the circuit including a plurality of constant size ports in the impeller, valve means for controlling the amount of liquid supplied to the circuit including an elongated casing having a bore extending lengthwise thereof and including an inlet port, a delivery port and an exhaust port, all of the ports communicating with the bore and the inlet and delivery ports respectively communicating with the pump and circuit, a piston valve member including an axial cavity opening towards the inlet and delivery ports and a port in the annular wall thereof operably related to the exhaust port, the member being shiftable in the bore between limiting positions in which the member port registers with the exhaust port and the member masks the exhaust port to thereby vary the fill of the coupling, a manually operable, actuating rod slidable in the bore, spring means interposed between the rod and valve member, and a sump communicating with the pump intake and the exhaust port.

LLOYD J. WOLF.

References Cited in the file of this patent

UNITED STATES PATENTS

| Number | Name | Date |
|---|---|---|
| 1,927,700 | Dickinson | Sept. 19, 1933 |
| 2,004,279 | Föttinger | June 11, 1935 |
| 2,074,346 | Sinclair | Mar. 23, 1937 |
| 2,151,075 | Berger | Mar. 21, 1939 |
| 2,372,326 | Hewitt | Mar. 27, 1945 |
| 2,392,421 | Stephens | Jan. 8, 1946 |
| 2,441,356 | Hertrich | May 11, 1948 |

FOREIGN PATENTS

| Number | Country | Date |
|---|---|---|
| 361,334 | Great Britain | Nov. 19, 1931 |